(12) United States Patent
Naniwa et al.

(10) Patent No.: US 9,025,423 B1
(45) Date of Patent: May 5, 2015

(54) THERMALLY CONDUCTIVE FEATURES FOR A HEAT-ASSISTED MAGNETIC RECORDING HEAD

(71) Applicant: HGST Netherlands B.V., Amsterdam (NL)

(72) Inventors: Irizo Naniwa, Fujisawa (JP); Tadaaki Tomiyama, Inagi (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/331,157

(22) Filed: Jul. 14, 2014

(51) Int. Cl.
*G11B 11/00* (2006.01)
*G11B 5/31* (2006.01)
*G11B 5/48* (2006.01)
*G11B 5/00* (2006.01)

(52) U.S. Cl.
CPC .............. *G11B 5/314* (2013.01); *G11B 5/4866* (2013.01); *G11B 2005/0021* (2013.01)

(58) Field of Classification Search
CPC .......... G11B 5/02; G11B 5/486; G11B 5/314; G11B 5/4866; G11B 5/4833; G11B 2005/0021; G11B 2005/0002; G11B 5/0005
USPC .......... 369/13.33, 13.32, 13.24, 13.14, 13.03, 369/13.12, 13.01, 13.35, 112.27; 360/59, 360/125.74
See application file for complete search history.

(56) References Cited

U.S. PATENT DOCUMENTS

| | | | |
|---|---|---|---|
| 7,964,888 B2 | 6/2011 | Loh et al. | |
| 8,023,228 B2 | 9/2011 | Sohn et al. | |
| 8,300,503 B2 | 10/2012 | Arai et al. | |
| 8,351,151 B2 * | 1/2013 | Katine et al. | 360/110 |
| 8,411,535 B1 | 4/2013 | Hirano et al. | |
| 8,477,570 B2 | 7/2013 | Arai et al. | |
| 8,518,748 B1 * | 8/2013 | Wang et al. | 438/119 |
| 8,681,594 B1 * | 3/2014 | Shi et al. | 369/112.27 |
| 8,773,664 B1 * | 7/2014 | Wang et al. | 356/401 |
| 8,824,247 B2 * | 9/2014 | Hurley et al. | 369/13.02 |
| 2010/0007980 A1 | 1/2010 | Kim et al. | |
| 2013/0223462 A1 | 8/2013 | Olson | |

* cited by examiner

*Primary Examiner* — Ali Neyzari
(74) *Attorney, Agent, or Firm* — John D. Henkhaus

(57) ABSTRACT

In a heat-assisted magnetic recording hard disk drive, one or more thermally conductive features are incorporated to assist with dissipation of heat from a laser module that comprises a laser and a submount. The submount may be coupled to the slider with solder covering a wider adhesive area for enhanced conduction of heat away from the laser module and to the slider, one or both of the submount and the laser may include a surface coating that increases the thermal radiation of the corresponding component, and/or one or both of the submount and the laser may include fins configured to transfer heat from the corresponding component. Further, a HAMR HGA may be configured such that the submount is coupled directly to the suspension flexure using a thermally conductive material, for conduction of heat away from the laser module and to the flexure.

19 Claims, 6 Drawing Sheets

THERMALLY CONDUCTIVE FEATURES FOR A HEAT-ASSISTED MAGNETIC RECORDING HEAD

FIELD OF EMBODIMENTS OF THE INVENTION

Embodiments of the invention relate generally to hard disk drives and more particularly to improving the heat dissipation associated with a laser for a heat-assisted magnetic recording head.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk.

Increasing areal density (a measure of the quantity of information bits that can be stored on a given area of disk surface) is one of the ever-present holy grails of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). More detailed information about the structure and functionality of a thermally assisted magnetic write head employing an NFT can be found in U.S. Pat. No. 8,351,151 to Katine et al., the disclosure of which is incorporated by reference in its entirety for all purposes as if fully set forth herein.

The performance of a HAMR system is largely affected by the performance of the associated laser. Therefore, inhibiting the degradation of the laser power during operation and over time is desirable for optimal performance of such a system.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed towards a heat-assisted magnetic recording (HAMR) head slider assembly, to a HAMR head slider head gimbal assembly (HGA), and to a hard disk drive comprising a HAMR head slider assembly, in which one or more thermally conductive features are incorporated to assist with dissipation of heat from a laser module that comprises a laser and a submount.

According to embodiments, the submount is coupled to the slider with solder covering a wider adhesive area than in prior approaches, such that solder is positioned along and outside of two of the submount sides that are essentially opposing the laser, such as with solder fillets. The amount and conductivity of the solder provides for conduction of heat away from the laser module and to the slider. According to embodiments, one or more of the submount and the laser is coated with a surface coating that increases the thermal transfer rate, or radiation, of the corresponding component. According to embodiments, one or more of the submount and the laser includes fins configured to transfer heat from the corresponding component.

According to embodiments, a HAMR HGA is configured such that the submount is coupled directly to the suspension flexure using a thermally conductive material, for conduction of heat away from the laser module and to the flexure. In each case, the dissipation of heat from the laser module is improved, thus lessening the degradation of the laser and its corresponding performance.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a heat-assisted magnetic recording (HAMR) head slider assembly in which one or more thermally conductive features are incorporated to assist with dissipation of heat from a laser module, for use in a hard disk drive for example, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments

Figure 1:
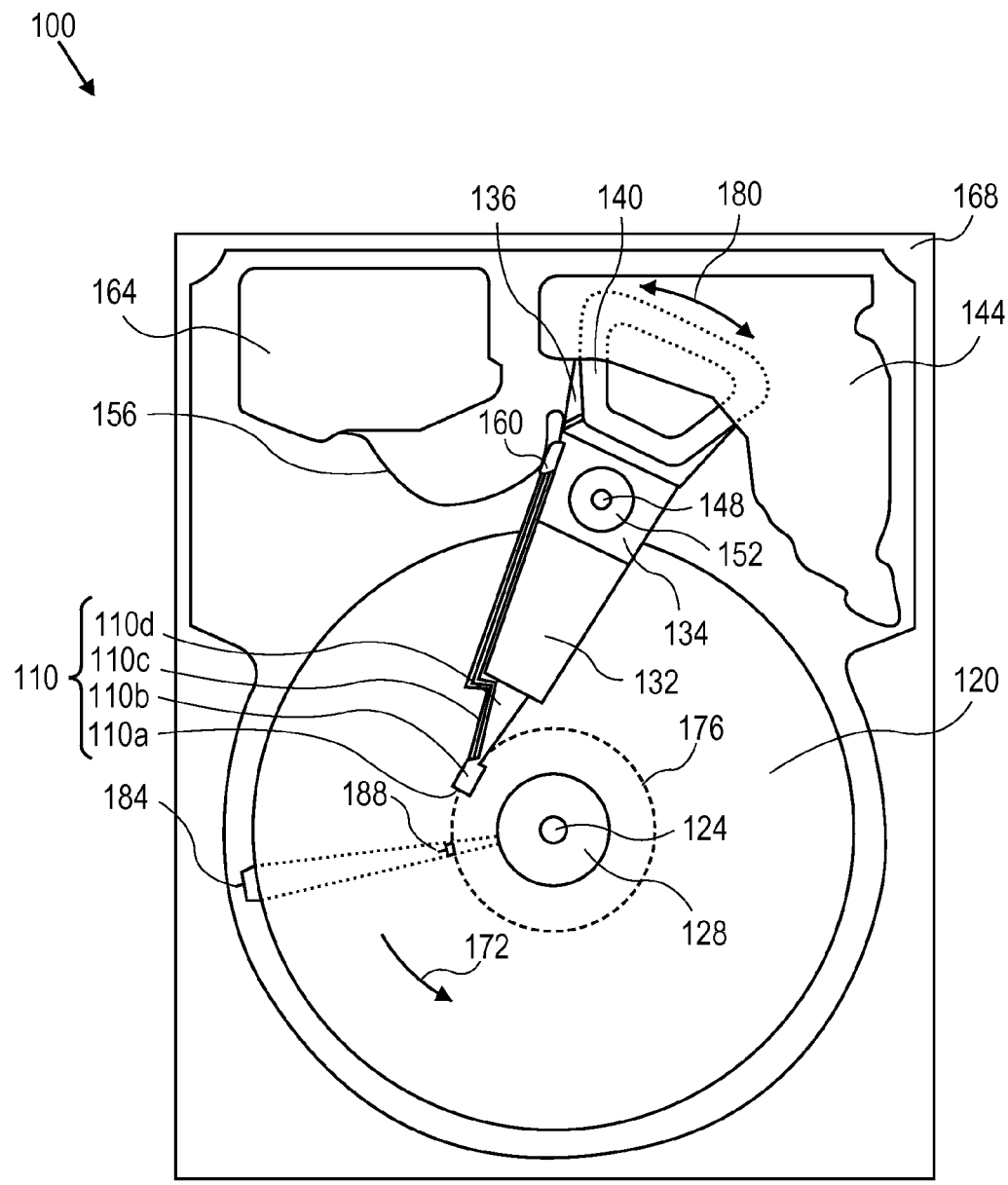
FIG. 1 is a plan view illustrating a hard disk drive (HDD), according to an embodiment of the invention.

Embodiments of the invention may be used in the context of a magnetic writer for a hard-disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a suspension flexure to which the head slider is coupled, an actuator arm (e.g., arm 132) to which the suspension is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components, such as a suspension tail. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Figure 2:
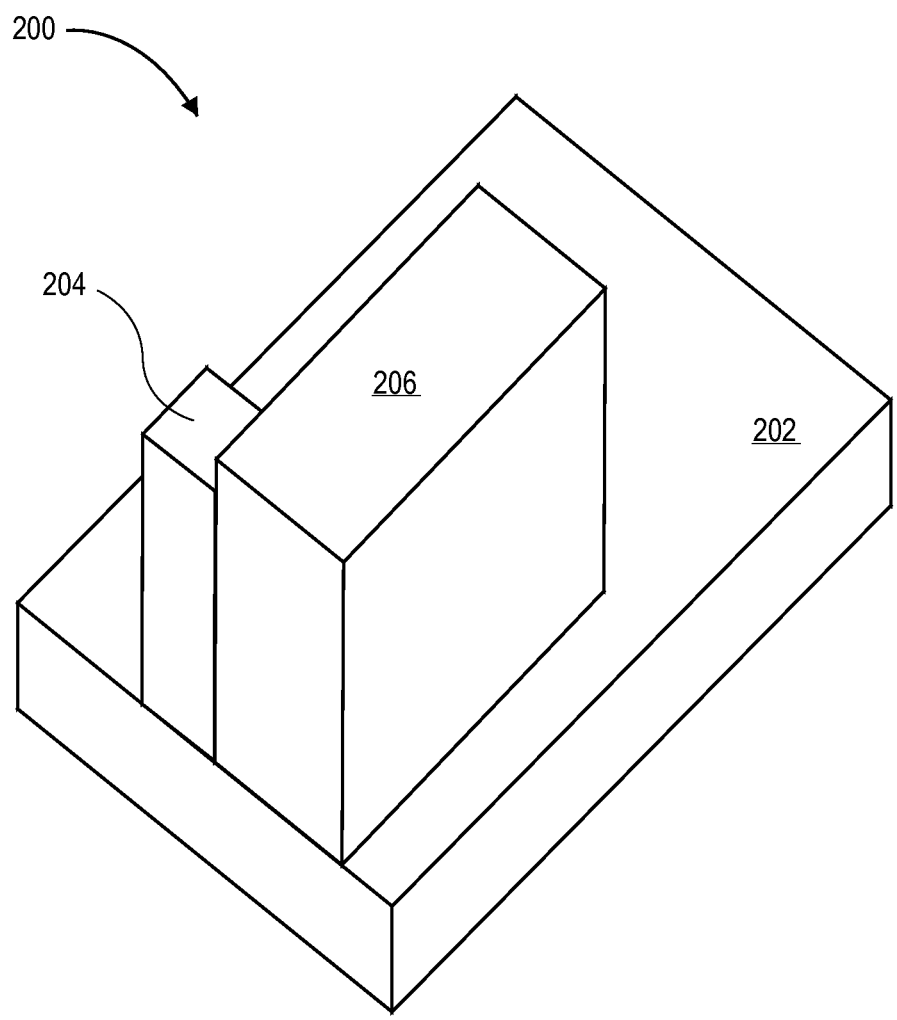
FIG. 2 is perspective view illustrating a heat-assisted magnetic recording (HAMR) head slider coupled with a laser module, according to an embodiment of the invention.

With HAMR, a laser light source (e.g., a laser diode) needs to be integrated onto a more traditional magnetic recording head. Laser diodes are fragile and not suitable for direct mechanical attachment to the recording head slider. Furthermore, a laser emission test utilized for checking the quality is virtually impossible to perform with a laser diode alone, before assembling. Therefore, a submount assembly may be used to mount the laser diode to the slider body. FIG. 2 is perspective view illustrating a heat-assisted magnetic recording (HAMR) head slider coupled with a laser module, according to an embodiment of the invention. HAMR head slider assembly 200 comprises a laser light source 204 (or simply "laser"), such as a laser diode, mounted to a submount 206 which is attached to a head slider 202 having a front face 203a and a back face 203b.

Figure 3:
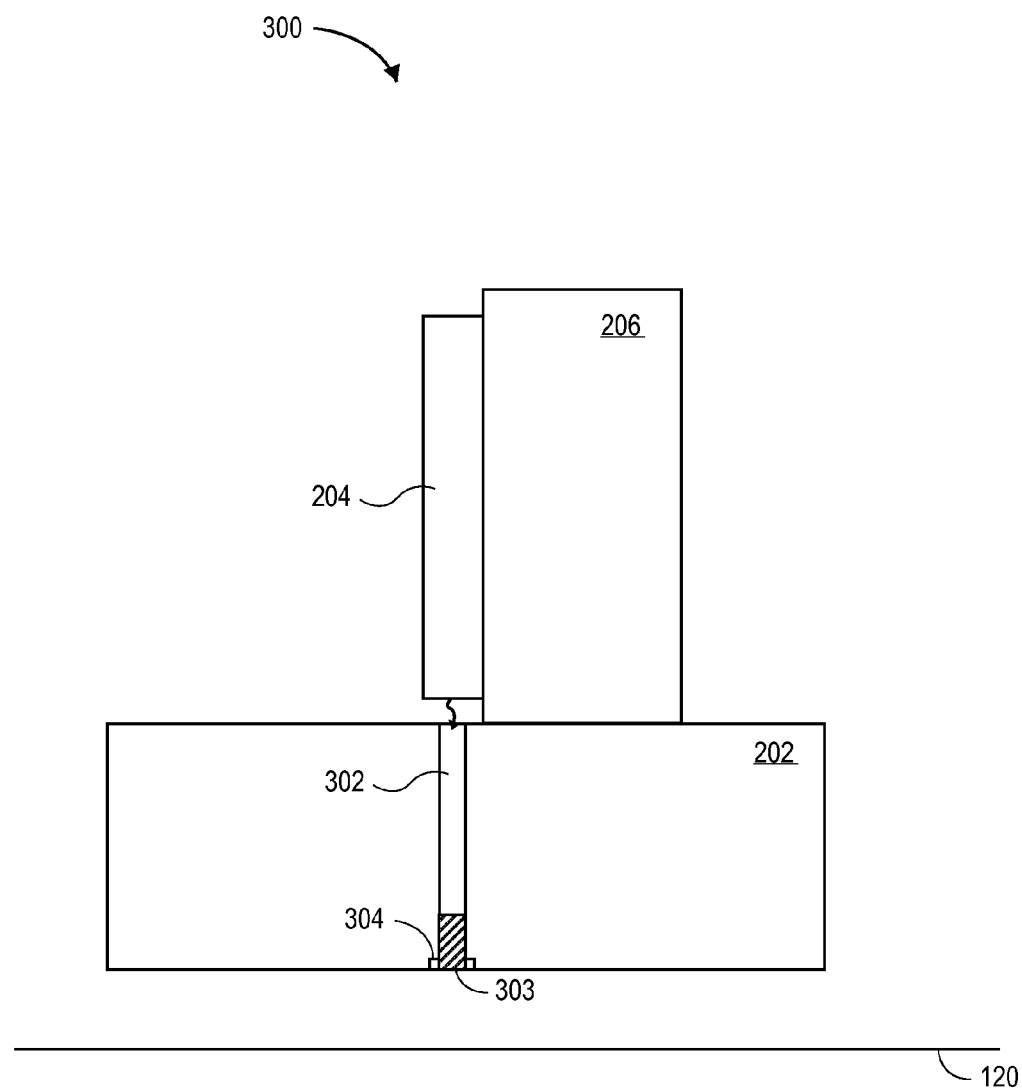
FIG. 3 is a side cutaway view illustrating a HAMR head slider coupled with a laser module, according to an embodiment of the invention.

FIG. 3 is a side cutaway view illustrating a HAMR head slider coupled with a laser module, according to an embodiment of the invention. With reference to FIG. 3, a HAMR head slider assembly 300 is described, which may be implemented into a hard disk drive such as HDD 100 (FIG. 1). HAMR head slider assembly 300 comprises a laser module assembly coupled with a HAMR head slider 202. The laser module assembly comprises the laser 204 mounted to submount 206, as explained in reference to FIG. 2.

HAMR head slider 202 comprises a HAMR waveguide 302 configured to guide optical energy from the laser 204 through the HAMR head slider 202 to a near-field transducer (NFT) 304 positioned near a write head 303. For a non-limiting example for further understanding, the NFT 304 may utilize a metal optical device such as an E-antenna (or a triangular antenna) which, when illuminated by light, excites a charge oscillation called a plasmon within the antenna. The charges concentrated at the edge of the antenna generate a localized higher intensity optical near-field. The optical near-field is electromagnetically coupled to the magnetic media 120 locally creating a high frequency current. The resistive losses associated with this current are converted to heat, raising the local temperature in the media 120.

During operation, the laser generates heat and the thermal conductivity between the submount and the slider is relatively low, so the heat is not dissipated to the slider air bearing surface as effectively as desired. Consequently, the laser heats up and degradation of the laser power and performance occurs, resulting in a less efficient laser.

Figure 4A:
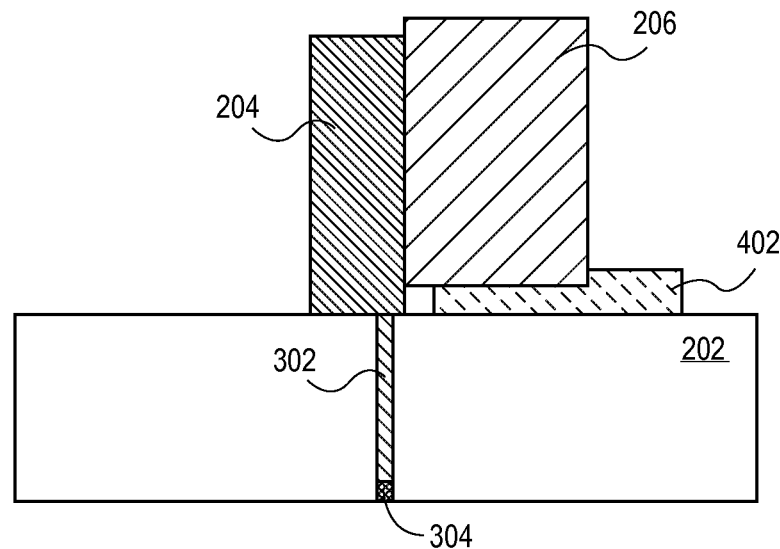
FIG. 4A is a side cutaway view illustrating a HAMR head slider coupled with a laser module, according to an embodiment of the invention.

Thermally Conductive Features for a Heat-Assisted Magnetic Recording Head Slider Assembly and Head Gimbal Assembly Larger Adhesive Area FIG. 4A is a side cutaway view illustrating a HAMR head slider coupled with a laser module, according to an embodiment of the invention. Similar to HAMR head slider assembly 300 (FIG. 3), the HAMR head slider assembly of FIG. 4A comprises a laser module assembly coupled with a HAMR head slider 202, where the laser module assembly comprises the laser 204 mounted to submount 206 and the head slider 202 comprises a HAMR waveguide 302 configured to guide optical energy from the laser 204 through the HAMR head slider 202 to a near-field transducer (NFT) 304.

According to an embodiment, a larger and wider mounting junction area than with known approaches is used to mount the submount 206 to the slider 202, to provide more conduction of heat away from the submount 206 to the slider 202. A thinner adhesive may also be used to mount the submount 206 closer to the surface of slider 202, such as by using solder instead of silver paste used with known approaches.

Figure 4B:
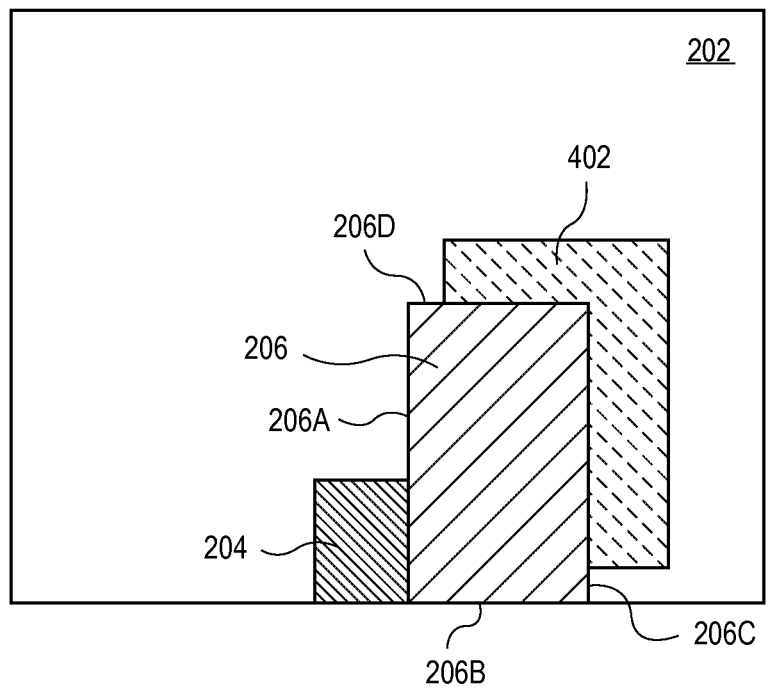
FIG. 4B is a top plan view illustrating the HAMR head slider of FIG. 4A, according to an embodiment of the invention.

FIG. 4B is a top plan view illustrating the HAMR head slider of FIG. 4A, according to an embodiment of the invention. FIG. 4B depicts submount 206 as having four sides, a first longitudinal side 206a, a first lateral side 206b, a second longitudinal side 206c, and a second lateral side 206d. As depicted, the first lateral side 206b is closer to the slider back face 203b, and thus closer to the write head, than is the second lateral side 206d. Thus, the laser 204 is coupled to the submount 206 on the first longitudinal side 206a and closer to the first lateral side 206b, and thus closer to the slider back face 203b, than to the second lateral side 206d. According to an embodiment, the submount 206 is coupled to the slider 202 using solder 402.

According to an embodiment, the submount 206 is coupled to the slider 202 with solder 402, such that the solder 402 is positioned along and outside of at least a portion of the second longitudinal side 206c and the second lateral side 206d, but not along the first longitudinal side 206a and the first lateral side 206b. Not only does the solder 402 provide a thinner adhesive than silver paste for mounting the submount 206 to the slider 202, but also provides a larger and wider adhesive area than with known approaches using silver paste just between the submount 206 and slider 202 (see, e.g., adhesive 501 of FIG. 5 for an example of a known submount-slider mounting approach). The larger surface area of solder 402 provides a greater heat transfer path, such as via conduction, between the submount 206 and the slider 202, and therefore, a more effective dissipater of the heat generated by laser 204 to the slider 202. Further, applying the solder 402 in these areas limits the possibility of a electrical shorts that might otherwise occur with contact between the solder and the electrical pads used to electrically connect the slider 202 with the flexure near the slider back face 203b. According to one embodiment, solder 402 comprises a solder fillet along the portion of the second longitudinal side 206d and/or the portion of the second lateral side 206c.

Coating Having Higher Thermal Transfer Rate

According to an embodiment, another feature that may be implemented to enhance the dissipation of heat from the submount 206 to the slider 202 is to coat at least a portion of the surface of the submount 206, and/or the laser 204, with a surface coating that increases the thermal transfer rate of the corresponding part, i.e., the coated submount 206 and or the coated laser 204. Therefore, the thermal radiation rate of the coated part is increased, thereby providing for better dissipation of heat away from the submount 206 and/or laser 204, for example via black-body radiation. For example, the submount 206 and/or laser 204 may be coated with a black film with high emissivity, i.e., its relative power to emit heat by radiation.

Submount-to-Flexure Mounting

Figure 5:
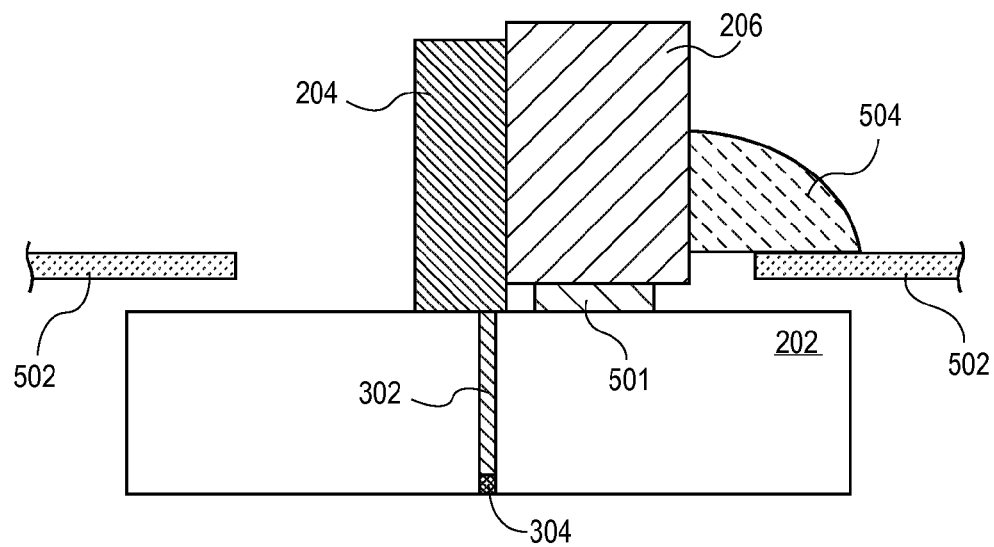
FIG. 5 is a side cutaway view illustrating a HAMR head slider coupled with a laser module, according to an embodiment of the invention.

FIG. 5 is a side cutaway view illustrating a HAMR head slider coupled with a laser module, according to an embodiment of the invention. Similar to HAMR head slider assembly 300 (FIG. 3), the HAMR head slider assembly of FIG. 5 comprises a laser module assembly coupled with a HAMR head slider 202, where the laser module assembly comprises the laser 204 mounted to submount 206 and the head slider 202 comprises a HAMR waveguide 302 configured to guide optical energy from the laser 204 through the HAMR head slider 202 to a near-field transducer (NFT) 304. FIG. 5 depicts in part a conventional approach to mounting the submount 206 to the slider 202 via an adhesive 501, for example a silver paste adhesive. However, the mounting technique illustrated and described in reference to FIG. 4A and FIG. 4B, e.g., using a larger solder 402 connection, may be used in place of the adhesive 501.

According to an embodiment, in addition to mounting the submount 206 to the slider 202, the submount 206 is also connected to the flexure 502 of a head gimbal assembly (HGA) using a thermally conductive material 504. According to an embodiment, the material 504 comprises a relatively high thermal conductivity, thereby providing for the transfer of additional heat from the submount 206 to the flexure 502. For example, submount 206 may be connected to the flexure 502 using a silver paste or using solder in the form of solder ball bonding or a fillet, for example.

Heat Transfer Fins

Figure 6A:
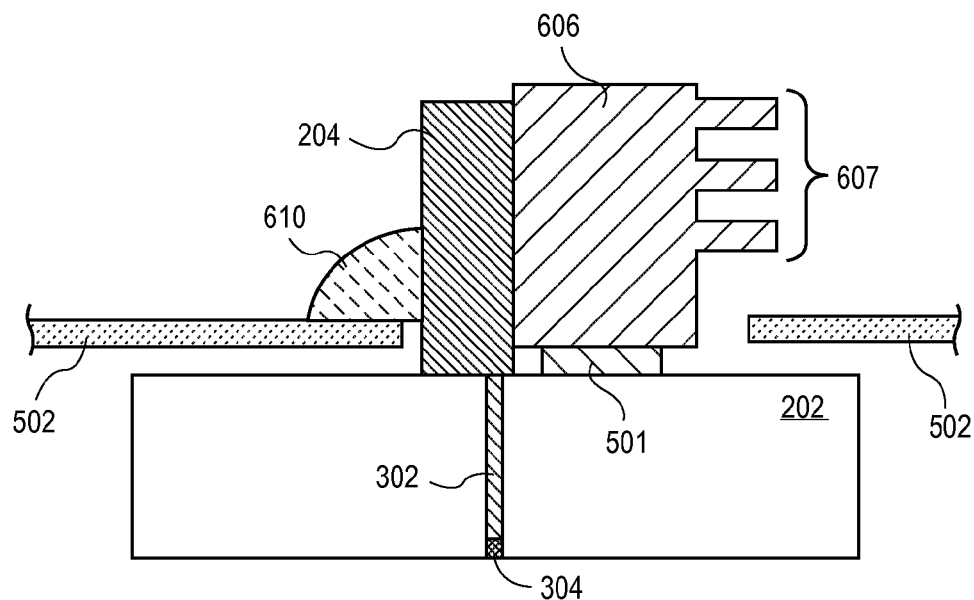
FIG. 6A is a side cutaway view illustrating a HAMR head slider coupled with a laser module, according to an embodiment of the invention.

FIG. 6A is a side cutaway view illustrating a HAMR head slider coupled with a laser module, according to an embodiment of the invention. Similar to HAMR head slider assembly 300 (FIG. 3), the HAMR head slider assembly of FIG. 6A comprises a laser module assembly coupled with a HAMR head slider 202, where the laser module assembly comprises the laser 204 mounted to a submount 606 and the head slider 202 comprises a HAMR waveguide 302 configured to guide optical energy from the laser 204 through the HAMR head slider 202 to a near-field transducer (NFT) 304. FIG. 6A depicts in part a conventional approach to mounting the submount 606 to the slider 202 via an adhesive 501, for example a silver paste adhesive. However, the mounting technique illustrated and described in reference to FIG. 4A and FIG. 4B, e.g., using a larger solder 402 connection, may be used in place of the adhesive 501.

According to an embodiment, submount 606 includes one or more heat transfer fins 607 configured to transfer heat from the submount 606, such as via convection. The number and configuration of fins 607 may vary from implementation to implementation and, therefore, three fins 607 are depicted for purposes of a non-limiting example. Further, laser 204 may be directly connected with flexure 502 of an HGA via adhesive 610, thereby transferring heat directly from the laser 204 to the flexure 502. For example, laser 204 may be connected to the flexure 502 using a silver paste or using solder in the form of solder ball bonding or a fillet, for example.

Figure 6B:
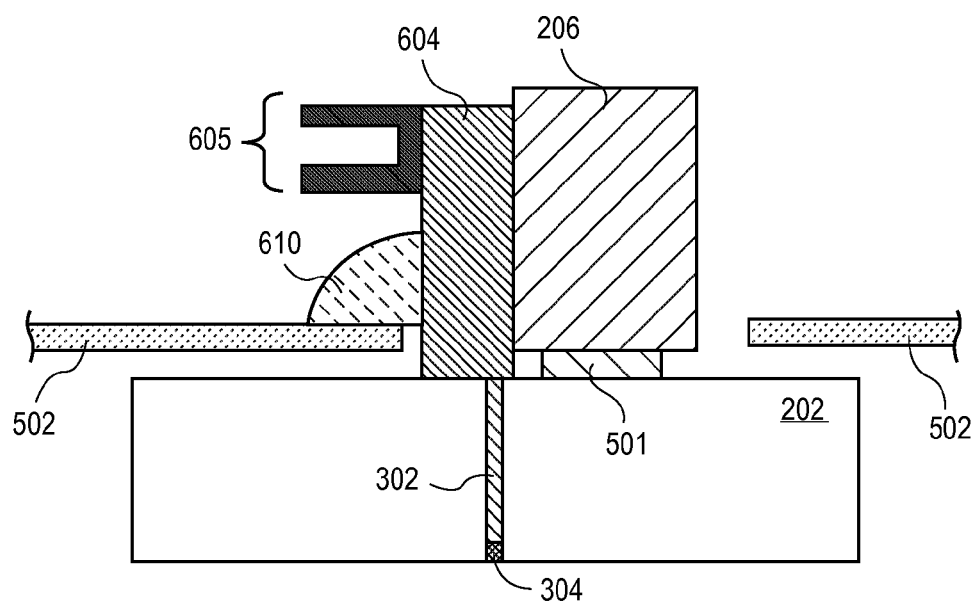
FIG. 6B is a side cutaway view illustrating a HAMR head slider coupled with a laser module, according to an embodiment of the invention.

FIG. 6B is a side cutaway view illustrating a HAMR head slider coupled with a laser module, according to an embodiment of the invention. Similar to HAMR head slider assembly 300 (FIG. 3), the HAMR head slider assembly of FIG. 6B comprises a laser module assembly coupled with a HAMR head slider 202, where the laser module assembly comprises a laser 604 mounted to the submount 206 and the head slider 202 comprises a HAMR waveguide 302 configured to guide optical energy from the laser 604 through the HAMR head slider 202 to a near-field transducer (NFT) 304. FIG. 6B depicts in part a conventional approach to mounting the submount 206 to the slider 202 via an adhesive 501, for example a silver paste adhesive. However, the mounting technique illustrated and described in reference to FIG. 4A and FIG. 4B, e.g., using a larger solder 402 connection, may be used in place of the adhesive 501.

According to an embodiment, laser 604 includes one or more heat transfer fins 605 configured to transfer heat from the laser 604, such as via convection. The number and configuration of fins 605 may vary from implementation to implementation and, therefore, two fins 605 are depicted for purposes of a non-limiting example. Further, laser 604 may be directly connected with flexure 502 of an HGA via adhesive 610, thereby transferring heat directly from the laser 604 to the flexure 502. For example, laser 604 may be connected to the flexure 502 using a silver paste or using solder in the form of solder ball bonding or a fillet, for example.

As multiple embodiments embodying thermally conductive features for a HAMR head slider assembly and head gimbal assembly are described herein, such as embodiments described in reference to FIGS. 4A-6B, it is appreciated that each embodiment may be implemented solely or that more than one embodiment may be implemented together. Thus, the nature and form of integration of the various embodiments described herein into a HAMR head slider assembly, into a head gimbal assembly, and into a hard disk drive, may vary from implementation to implementation.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A heat-assisted magnetic recording (HAMR) head slider assembly comprising:
    a head slider comprising a magnetic write head configured to write to a magnetic-recording disk;
    a laser module coupled with said slider, said laser module comprising:
        a submount having a first and a second longitudinal sides and a first and a second lateral sides, wherein said first lateral side is closer to said write head than said second lateral side, and
        a laser coupled to said submount on said first longitudinal side and closer to said first lateral side than said second lateral side; and
    wherein said submount is coupled to said slider with solder such that said solder is positioned along and outside of at least a portion of said second longitudinal side and at least a portion of said second lateral side and not positioned along said first longitudinal side and said first lateral side.

2. The HAMR head slider assembly of claim 1, wherein said solder is positioned at least in part to provide conduction of heat from said submount to said head slider.

3. The HAMR head slider assembly of claim 1, wherein said solder is configured as a solder fillet along at least a portion of said second longitudinal side and at least a portion of said second lateral side.

4. The HAMR head slider assembly of claim 1, wherein said submount is coated with a surface coating that increases the thermal transfer rate corresponding to said submount.

5. The HAMR head slider assembly of claim 4, wherein said surface coating comprises a black film having a higher emissivity than said submount.

6. The HAMR head slider assembly of claim 1, wherein said laser comprises a laser diode coated with a surface coating that increases the thermal transfer rate corresponding to said laser diode.

7. The HAMR head slider assembly of claim 6, wherein said surface coating comprises a black film having a higher emissivity than said laser diode.

8. The HAMR head slider assembly of claim 1, wherein said submount comprises fins configured to transfer heat from said submount.

9. The HAMR head slider assembly of claim 1, wherein said laser comprises a laser diode comprising fins configured to transfer heat from said laser diode.

10. A heat-assisted magnetic recording (HAMR) head gimbal assembly (HGA) comprising:
a flexure;
a head slider comprising a magnetic write head configured to write to a magnetic-recording disk, said slider coupled to said flexure;
a laser module coupled with said slider, said laser module comprising:
a submount having a first and a second longitudinal sides and a first and a second lateral sides, wherein said first lateral side is closer to said write head than said second lateral side, and
a laser coupled to said submount on said first longitudinal side and closer to said first lateral side than said second lateral side; and
wherein said laser module is coupled with said flexure via a thermally conductive material.

11. The HAMR HGA of claim 10, wherein said thermally conductive material comprises silver paste.

12. The HAMR HGA of claim 10, wherein said thermally conductive material comprises solder.

13. The HAMR HGA of claim 10, wherein said submount is coupled to said slider with solder such that said solder is positioned along and outside of at least a portion of said second longitudinal side and at least a portion of said second lateral side and not positioned along said first longitudinal side and said first lateral side.

14. The HAMR HGA of claim 10, wherein at least one of said submount and said laser is coated with a surface coating that increases the thermal radiation of the coated part.

15. The HAMR HGA of claim 10, wherein at least one of said submount and said laser comprises fins configured to transfer heat from said at least one of said submount and said laser.

16. A hard disk drive, comprising:
a magnetic-recording disk rotatably mounted on a spindle;
a heat-assisted magnetic recording (HAMR) head slider comprising:
a magnetic write head configured to write to said magnetic-recording disk;
a laser module coupled with said slider, said laser module comprising:
a submount having a first and a second longitudinal sides and a first and a second lateral sides, wherein said first lateral side is closer to said write head than said second lateral side,
a laser coupled to said submount on said first longitudinal side and closer to said first lateral side than said second lateral side, and
wherein said submount is coupled to said slider with solder such that said solder is positioned along and outside of at least a portion of said second longitudinal side and at least a portion of said second lateral side and not positioned along said first longitudinal side and said first lateral side; and
a voice coil motor configured to move said HAMR head slider to access portions of said magnetic-recording disk.

17. The hard disk drive of claim 16, wherein said solder is positioned at least in part to provide conduction of heat from said submount to said head slider.

18. The hard disk drive of claim 16, wherein at least one of said submount and said laser is coated with a surface coating that increases the thermal radiation of the coated part.

19. The hard disk drive of claim 16, wherein at least one of said submount and said laser comprises fins configured to transfer heat from said at least one of said submount and said laser.

* * * * *